April 7, 1970      C. O. CHILDRESS      3,504,625

ELECTROSTATIC PRINTING

Filed May 3, 1968

INVENTOR.
CLYDE O. CHILDRESS
BY *Lindenberg & Freilich*
ATTORNEYS.

United States Patent Office 3,504,625
Patented Apr. 7, 1970

3,504,625
ELECTROSTATIC PRINTING
Clyde O. Childress, Palo Alto, Calif., assignor to Monsanto Graphic Systems, Inc., St. Louis, Mo., a corporation of Delaware
Continuation-in-part of application Ser. No. 385,033, July 25, 1964. This application May 3, 1968, Ser. No. 726,477
Int. Cl. B41m 1/12, 1/34, 1/40
U.S. Cl. 101—129  17 Claims

ABSTRACT OF THE DISCLOSURE

An improved process for printing or decorating conductive surfaces such as hot metal or glass is disclosed. A conductive image-apertured screen is disposed parallel to the surface and an electric field is established and maintained between the screen and the surface. Finely divided organosilicone coated powders, such as high silica content glass forming metal oxide frits, are applied to the outer surface of the screen and pass into the field and deposit on said substrate in the form of said image. The organosilicone coating is applied to the powder particles by dispersing the particles in an organosilicone such as a silane or a siloxane, heating the dispersion at about 100° C. to 800° C. until dryness and breaking up mechanically any agglomerates that are formed.

CROSS REFERENCE TO RELATED APPLICATION

The present application is a continuation-in-part of an application Ser. No. 385,033, filed July 25, 1964, entitled "Improvement in Electroscopic Powders" and now abandoned.

BACKGROUND OF THE INVENTION

Field of the invention

This invention relates to electrostatic printing utilizing electroscopic printing powders and more particularly to a method of electrostatic printing utilizing specially treated glass and metal oxide frits.

Description of the prior art

Patent No. 3,081,898 to Childress et al. exemplifies a process of electrostatic printing which requires neither contact nor pressure between the printing element and the substrate to be printed or decorated. An electric field is established between an image screen and the substrate or image receiving member. Electroscopic powders are then applied to the back side of the image screen and passed through the openings in the screen and enter the field. The charged particles are transported by the field linearly to the substrate in a pattern having a form of the image openings in the screen. This image pattern of particles strikes the substrate and becomes attached thereto. The powder may be fixed to the substrate in the printing position or the substrate may be removed and transported to a different station and the powder fixed at a later time if desired.

The process described could be of particular advantage in printing or decorating conductive substrates such as glass or metals, especially when the surfaces are curved, with high melting decorating compositions, such as glass, ceramic or metal oxide frits. Typically, to decorate glass bottles, the hot glass bottle is removed from the forming mold and is slowly cooled and annealed in a lehr to remove strain. A glass frit is usually applied to the cold bottle and fixed by refiring the bottle and then gradually cooling it again in a lehr.

It has not been possible to apply the glass frit to the bottle while hot by conventional stencil techniques. The electrostatic process described does not require that the stencil be in contact with the hot glass surface. Furthermore, the particles are linearly propelled toward the surface and are capable of much firmer attachment.

However, it has still been found difficult in many cases to lay down a fully acceptable glass frit or metal oxide powder image on the substrate. The particles or frit are found to make an excessive number of trips between the image screen and the substrate before finding a stable attachment.

OBJECTS AND SUMMARY OF THE INVENTION

Consequently, it is an object of this invention to provide an improved frit printing powder of the type described that can be utilized in the electrostatic printing of conductive surfaces.

Yet another object of the invention is the provision of an electrostatic process for decorating hot metal or hot glassware with high melting point frits.

A still further object of the invention is the provision of electroscopic ceramic or glass frit particles that are capable when placed in an electric field of holding a charge and are capable after contacting a hot conductive substrate of maintaining their charge.

These and other objects and many attendant advantages of the invention will become apparent as the description proceeds.

It has been found, according to the invention, that the behavior of high temperature decorating frit particles in an electrostatic printing process as described is vastly improved when the particles are encapsulated with a coating of an organosilicone material.

It is believed that the improved image achieved is attributable to modification of the surface triboelectric properties of the particles. Glass or ceramic frits are combinations of various metal oxides and silicates with minor amounts of other compounds such as fluorides. In any batch of frit, samples of the frit will be uniform in composition, but individual particles will differ in composition. Therefore, these particles will also differ in charge holding ability. Furthermore, as a class, these particles lose their charge easily, necessitating several trips before they hold sufficient charge to form a holding attachment with a conductive substrate. Moreover, contact of the particles with the conductive substrate can also cause a dissipation of the charge carried by the particle, with a consequent increased difficulty in laying down an acceptable powder image.

Another characteristic of these decorating frits is the presence of a firmly bound layer of water on the surface. These particles are substantially hygroscopic which is generally the case with materials having a large $SiO_2$ content. The presence of this tenaciously held moisture materially interferes with the triboelectric charging of the frit.

It is known that organic materials of hydrocarbon nature have very desirable triboelectric characteristics and also are water repellant. However, hydrocarbons even in polymeric form are not stable at high temperature. These triboelectric characteristics of the hydrocarbon can be simulated according to the invention which provides glass frit particles that are stable at high temperature and present an essentially hydrocarbon envelope, as will be explained in the following detailed description, when considered in connection with the accompanying drawings.

It is to be understood that the following detailed description and examples are offered only for purposes of illustration and that numerous modifications, substitutions and alterations in procedures, conditions and materials are intended and permissible without departing from the scope of the invention:

DESCRIPTION OF THE PREFERRED EMBODIMENTS

The frits, as used in this specification, define a class of high temperature decorating materials as known in the art. These materials are generally composed of a glass forming composition and may contain heat resistant organic or inorganic pigments. Sometimes the glass composition is inherently colored, and other times coloring agents such as titanium dioxide as a white pigment, cadmium sulfide-selenide as a red pigment or a cobalt oxide-chrome oxide-iron oxide mixture as a black pigment are added. When fixed by firing, these glass or enamel frits form a glossy adherent coating on the substrate to which they are attached. The frits generally are prepared in batches having an average particle size of between 0.1 to 100 microns and most usually range between 1 to 50 microns average particle size.

Commonly, the glass forming composition is based on oxides of lead and silica with varying amounts of other oxides such as sodium oxide, boric oxide, cadmium oxide, calcium oxide, aluminum oxide, and zirconium oxide, or a fluoride such a sodium fluoride. Generally, the frits contain a substantial amount of silica usually ranging between about 20 to 60 percent by weight and most usually between 30 to 50 percent by weight. Though frits usually are composed of irregularly shaped particles, the invention is also intended to cover regularly shaped particles, such as microspheres and inorganic coloring material such as red iron oxides.

Figure 1:
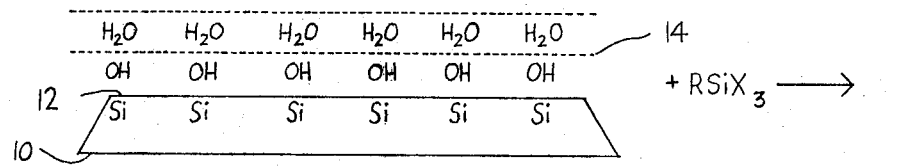
FIGURE 1 is a schematic representation of a proposed reaction sequence for the formation of an overcoating from an organosilicone monomeric material onto a large silica containing material.
Figure 1:
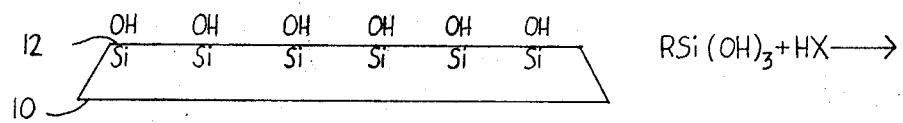
Figure 1:
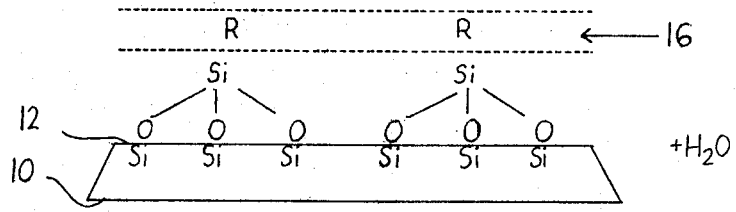

Referring now to FIGURE 1, the high silica content particles 10 contain a number of silanol groups that provide hydroxyl sites on the surface 12. The particle surface is additionally covered with a thin film of water 14. The surface characteristics of the organosilicone are transferred to the particles by a coating technique. The organosilicone such as a silane or a siloxane becomes permanently attached to the surface of the frit particle through bonding which may be primarily chemical, partially chemical, e.g., chemisorption or primarily physical, e.g., encapsulation.

The organosilicone compound can be a silane provided with a substituent that is reactive with the surface silanol groups. For example, silane monomers of the formula:

may contain at least one substituent R which is essentially hydrocarbon in nature, such as lower alkyl, aryl, alkenyl, or substituted derivatives thereof such as aminoalkyl. X is a silanol reactive moiety such as alkoxy, halo or hydroxy. Y and Z are either the same or different and are selected from X or R or may be other substituents such as amino or alkylamino. Preferably there are three hydrolyzable groups X present to provide more available sites for bonding to the particle surface.

If either a halo silane or an alkoxy silane is present, it is capable of direct reaction with the surface silanol groups, and a hydrohalic acid or alcohol is formed as a by-product. The silane can also react with the surface silanol groups after hydrolysis to the silanol form. The water layer 14 bound to the surface can provide the water necessary for hydrolysis. About 0.15 to 0.35 gram of water per gram of silane are required for reaction to cover about 400 to 800 m.²/gram of surface area. Referring again to FIGURE 1, three surface silanol hydroxyl groups condense with the silane in the silanol form to form Si—O—Si bonds and this orients the silane to project the hydrocarbon moiety R to the exterior to form a hydrocarbon sheath 16.

Figure 2:
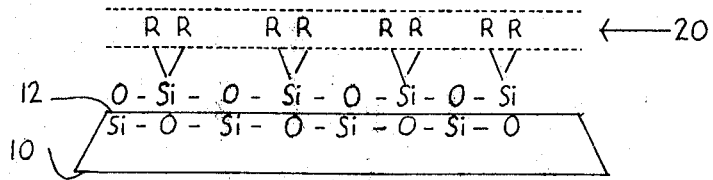
FIGURE 2 is a schematic representation of a proposed reaction sequence between a material having a high silica content and a polymeric organosilicone.

The silane can also be catalytically activated by the surface and on contact with water condenses and forms a siloxane polymer with the characteristic silicon-oxygen back-bone. This Si—O—Si chain can orient with relation to the surface to form a very strong chemisorption bond. Again, as shown in FIGURE 2, the organic radical will orient away from the surface to provide an organic sheath 20. These bonding processes are aided by heat which causes a removal of the adsorbed surface moisture film and permits closer approach of the siloxane or silane to the surface. Both the Si—O—Si bonds and the Si—C bonds are very stable and do not readily decompose except at very high temperature. This high temperature performance is very important for printing on hot metal and hot glass substrates.

Suitable exemplary monomeric silanes are ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, trimethychlorosilane, dimethyldiethoxysilane, di-phenyldichlorosilane, diphenyldiethoxysilane, beta-carbethoxyethyltriethoxysilane, beta-carbetoxypropoylmethyldiethoxysilane.

Other suitable silanes are beta-cyanoethyltriethoxysilane, methyltriethoxysilane, n-propyltrichlorosilane, n-butyltrichlorosilane, octadecyltrichlorosilane, dichlorophenyltrichlorosilane, n-(trimethoxysilylpropyl) ethylenediamine, and gamma-chloropropyltrimethoxy silane.

The next group of silanes are termed reactive because even though they have an essentially hydrocarbon substituent, they contain functionality such as vinyl unsaturation or a condensable group such as amino which is capable of reaction with further materials to provide a further hydrocarbon overcoat. Examples of reactive silanes are gamma-aminopropyltrimethoxy silane, gamma-aminopropyltriethoxysilane, N-(beta-aminoethyl)-gamma-aminopropyltrimethoxysilane, vinyltrichlorosilane, vinyltriethoxysilane, vinyl-tris(beta-methoxy ethoxy) silane, vinyltriacetoxysilane, vinyltrimethoxysilane, gamma- methacryloxypropyltrimethoxysilane, 3,4-epoxycyclohexylethyltrimethoxysilane, glycidoxypropyltrimethoxysilane, and methylvinyldichlorosilane.

Although the organoalkoxysilanes are less reactive than chlorosilanes, the alkoxy silanes are easier to use because the biproducts from hydrolysis are alcohols rather than the corrosive hydrochloric acid. An advantage of the monomers as compared to polymers is that only a very thin coating is provided on the frit, whereas polymers provide a substantially thicker coating. The thinner coating enables the provision of dust-like particles.

Typical polymeric materials are those of the formula:

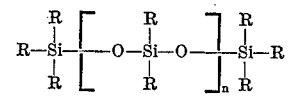

where R is lower alkyl such as methyl or aryl such as phenyl or alkoxy, amino or other substituent. The most widely available polymers are the silicone fluids or greases which are polydimethylsiloxanes, having a polymer length where $n$ is from 0 to 2,000 or more and the viscosity at room temperature ranges between about 0.65 to 1 million centistokes and preferably is between 2 and 400. Referring again to FIGURE 2, these polymers will encapsulate the frit particle 10 and are believed to preferentially orient the hydrocarbon moiety away from the surface to form a hydrocarbon sheath 20. Under the proper conditions, the surface of some silica containing frits will have a catalytic effect on a silicone polymer. The polymers can rearrange and depolymerize to form fragments which may then react with the surface in the same manner described for monomeric silanols as illustrated in FIGURE 1. This reaction would be favored at high temperature.

The organosilicone hydrocarbon sheath is provided by mixing the frit powder with an organosilicone fluid which may be the pure monomer or polymer or a solvent dispersed system thereof to form a dispersion of the frit in the silicone. Any solvent used to dissolve or disperse the monomer or polymer is removed by evaporation to return the particles to a dry powder form. Agglomerates that are formed are broken up mechanically.

In the case of the liquid monomers, excess monomer should also be removed by evaporation and therefore the paste dispersion of glass frit particles and monomers should be heated above the boiling point of the monomer which usually is in the range of about 70° C. to 300° C. at 760 mm., but may be at a lower temperature at reduced pressure. These monomers and polymers are soluble in most organic solvents such as alcohols, aromatic solvents, aliphatic solvents, and ketones, such as acetone, benzene, chloroform, dioxane, ethanol, heptane, and toluene. As discussed previously, the bonding characteristics of the organosilicone to the surface of the frit particle are greatly enhanced when the dispersion is heated. It is preferred to heat the dispersion to a temperature of at least 100° C. up to about a temperature of 800° C. and preferably from 300° C. to 600° C. The treatment should be conducted below the melting point of the particular frit to avoid excessive agglomeration. Some specific examples of preparing organosilicone sheathed frits are disclosed below.

EXAMPLE I

Ten grams of powdered blue glass frit comprised of particles of No. 26–C–I (manufactured by the Ferro-Electric Corporation, 60 Greenway Drive, Pittsburgh, Pa.) were dispersed in 5–10 milliliters of A–1100 silane (gamma - aminopropyltriethoxy-silane). The resultant paste dispersion was heated at 400° F. for one hour. The powder after baking had some tendency to form agglomerates which were easily broken up mechanically to form a free flowing powder. This free flowing powder easily acquires and holds a negative electric charge and prints well with the image screen held negative relative to the receiving surface. The powder was rebaked to 800° F. for one hour and again tested. The powder still easily acquired a negative charge and prints preferentially with the screen held at a negative potential relative to the image receiving surface. Glass frit of this type which is untreated will not print satisfactorily at either polarity.

EXAMPLE II

Ten grams of finely powdered white glass frit No. 27–W–1–A (Ferro Electric Corporation) was dispersed in 7 milliliters of a solution of General Electric SF–69 silicone fluid, a polydimethylsiloxane having a viscosity of about 4 to 40 cs. at 77° F. The silicone solution contained one part of SF–69 in four parts of trichloroethylene. The frit is believed to contain titanium dioxide in combination with finely divided glass forming particles. The paste dispersion was baked for 3 hours at 450° F. A cake was formed and was easily pulverized into a fine, freely-flowing powder. This powder aquired a negative charge and produced an excellent print when the screen was held at a negative potential relative to the conductive receiving surface.

EXAMPLE III

Ten grams of glass frit No. 28–R–Red (Ferro Electric Corporation) was saturated with 5 milliliters of silicone mold release No. 225 (Ram Chemicals, Inc., Gardena, Calif.). This silicone fluid is a solution of a silicone resin in a mixture of alcohol and petroleum naphtha. The silicone resin is believed to be a medium viscosity polydimethylsiloxane. The resulting dispersion was air dried. The powder easily acquired and held a negative charge giving an excellent print when the image screen was held at a negative potential relative to the conductive receiving surface. With the image screen held at a positive potential, very little deposit was layed down. With an untreated glass frit under the same test conditions very little powder is layed down or transferred to the receiving substrate regardless of the polarities that are used between the screen and substrate.

EXAMPLE IV

A clear glass frit, in which the highest percentage of particles were sized in the range of from 2 to 10 microns, was combined with a solution of Krylon mold release No. 1328 (which is believed to be a solution of polydimethylsiloxane) using only sufficient solution to form a moist crumbly paste. The composition by weight of the clear glass frit was as follows: $Na_2O$—5.6%, $CaO$—11.30%, $Al_2O_3$—12.0%, $B_2O_3$—22.5%, $SiO_2$—48.6%. The paste dispersion which was formed was baked for one hour at 750° F. and was then cooled. Agglomerates that formed were broken to form a fine powder. The resultant particles accepted and held a strong negative charge resulting in a good print when the screen was held at a negative potential relative to conductive receiving surface. The untreated frit would not print satisfactorily with either polarity under the same conditions.

EXAMPLE V

Fine glass spheres have a high percentage of particles within the size range from 3–20 microns which are designated as 3M "Superbright" glass beads, catalogue No. 986 (Minnesota Mining and Manufacturing Company) were combined with a sufficient quantity of mold release No. 225 (Ram Chemicals, Inc.) to form a creamy paste. The resultant paste was baked for two hours at 500° F. The organosilicone encapsulated fine beads now accepted and held a strong negative charge and printed well with an image screen held at a negative potential relative to the receiving surface. The untreated beads could not be printed with either polarity of the screen relative to the print receiving surface.

EXAMPLE VI

Two grams of powdered red iron oxide were combined with one milliliter of A–1100 silane silicone fluid (Union Carbide). The resultant paste was baked at 500° F. for one hour. The organosilicone coated powder easily accepts and retains a negative charge producing a good print with the image screen held at a negative potential relative to the receiving surface. The untreated powder provided an inferior print regardless of the polarity of the screen relative to the image receiving electrode.

Improved electrostatic prints are achieved according to the invention by disposing a conductive image apertured screen spaced from a conductive substrate, establishing an electric field between the screen and the substrate, applying to the rear side of the screen organosilicone coated particles selected from metal oxide, glass forming oxides or a mixture thereof and passing the particles through the screen into and across the electric field onto the substrate. The image apertured screen comprises a member in which the printing areas comprise a fine open mesh screen and the non-printing areas are suitably masked to prevent passage of the frit particles.

Frit particles will have a particle size capable of passing through the open areas of the screen. The screen surface need not be planar and if the printing is to occur on a curved surface, a curved stencil may be utilized to curve the electric field. The useful range of field strength may be varied between about 300 volts and 10,000 volts and is maintained in a range to provide a satisfactory transfer of the particles to the substrate, but below the arcing potential between the screen and the substrate. The optimum voltage is determined by the width of the air gap and the characteristics of the substrate and the particular frit being utilized. The air gap is usually maintained in the range from about 0.01 to about 0.5 inch and usually is about 0.015 to 0.05 inch.

Figure 3:
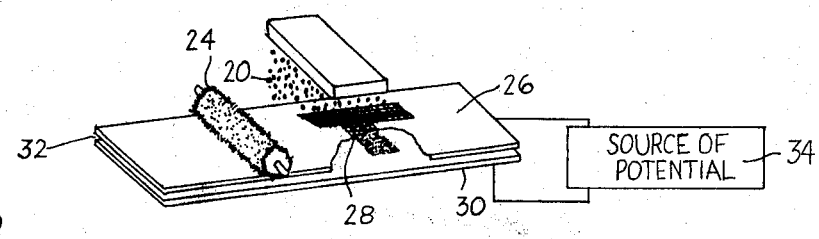
FIGURE 3 is a schematic representation of an electrostatic printing apparatus for use in the process of the invention.

A suitable apparatus for practice of the process of the invention is illustrated in FIGURE 3. Glass pigment powder particles 20 are fed from source 22 onto an application means, such as a soft roller or brush 24. The brush 24 is brought into contact with the conductive stencil 26 having opened screen areas 28. The stencil 26 is disposed parallel to a hot plate 30 so as to form an air gap 32 therebetween. A source of potential 34 is connected to the stencil 26 and the hot glass plate 30. The frit particles which contact the open areas 28 of the stencil 26 enter the gap 32. These particles tend to follow parallel field lines and travel across the air gap from the stencil screen 26 to the hot glass plate 30 with very little dispersion. The invention operates equally regardless of which voltage polarity is applied to the stencil and backing plate so long as they are opposite. However, better results are obtained with the materials of the examples when the screen is held at negative potential.

The conditions used for testing the glass frits as described in the examples were as follows: An image screen consisting of a 200 mesh stainless steel wire cloth with selected areas masked to leave openings only in those areas wherein images desired was positioned with appropriate tension 1/32 of an inch (0.333 inch from and parallel to a conductive print receiving surface. The image screen and receiving surface were held at a suitable potential difference by being connected to a direct current power supply. This screen was generally held at ground potential and the receiving surface has approximately 3000 volts positive or negative as was specifically indicated. The glass frit which was untreated would not print effectively. After treatment according to the examples, no problems with printing were experienced.

It is to be appreciated that the printing means and process of the invention is not limited to letters or symbols, but pictures or any other representations or decorations and even entire areas may be duplicated using this system. Furthermore, this invention is not limited to a single color printing process. A plurality of different pigment colors may be laid down either by employing in sequence a plurality of different screens each for applying a different area or a multiple layer of colors can be applied by applying differently colored glass frit in succession to the same screen while the conductive substrate remains stationary.

It is also to be understood that the manner in which a charge is imparted to the frit powder particles may be varied according to one or more of the following procedures. Particles may acquire charge by repeated contact with a conductive surface connected to a source potential. The powder particles may also be charged by triboelectric contact with triboelectrically dissimilar material surfaces which may be incorporated in the frit particle feed system. A corona discharge may be used, etc. No matter by what means the charge is applied to the powder particles, the electroscopic properties of the powder are improved to a state such that they acquire charge readily and retain this charge for extended periods, even when printed on conductive surfaces whereas the charge on uncoated particles of the original composition would be immediately dissipated. Though the reasons for this are not fully understood, it is believed, as explained, that the organo- silicone film deposited on the surface of the particles acts not only as an electrical insulator preventing rapid charge loss to conductive surfaces, but also as a triboelectrically active component which easily acquires charge by electron exchange with other surfaces.

There has accordingly been described and shown herein a novel, useful and unique method and means for treating electroscopic particles for the purpose of improving their properties for use in electrostatic printing process. As a result of the treatment given to the particles in accordance with this invention, it is possible to achieve prints using electrostatic techniques having desired density and excellent resolution which are impossible to achieve with the untreated powder particles.

Although particular embodiments of the invention have been described and illustrated herein, it is recognized that modifications and variations may readily occur to those skilled in the art and consequently, it is tended that the claims be interpreted to cover such modifications and equivalents.

In the claims:

1. A method of forming an electrostatic print comprising the steps of:
   disposing an image-apertured conductive screen spaced from a hot, high melting point conductive substrate desired to be printed;
   establishing and maintaining an electric field between said screen and said substrate;
   applying a dry, finely divided free flowing powder consisting essentially of particles of a high melting point ceramic or glass decorating material encapsulated in a baked organosilicon coating to the outer surface of said screen, said particles having a melting point below the melting point of said substrate;
   passing the particles through the apertures in said screen, into said field and onto said substrate, whereby said particles will deposit on said substrate an image pattern corresponding to the apertured areas of said screen; and
   heating said substrate and applied pattern of particles to a temperature above the fusing point of said particles.

2. A method according to claim 1 in which said substrate member is selected from glass and metal.

3. A method according to claim 1 in which said screen and substrate are spaced parallel to one another to form a gap of about 0.01 inch to about 0.5 inch.

4. A method according to claim 3 in which the gap is about 0.015 inch to about 0.05 inch.

5. A method according to claim 1 in which the organosilicone is selected from silanes of the formua:

where R is a hydrocarbon radical selected from lower alkyl, aryl, alkenyl and substituted derivatives thereof, X is selected from halo, alkoxy and hydroxy and Y and Z are selected from X, R, amino and alkylamino; and siloxanes of the formula:

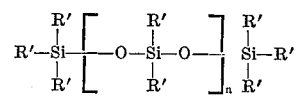

where R' is selected from lower alkyl, aryl, alkoxy and amino and $n$ is an integer between 0 and 2,000.

6. A method according to claim 5 in which X, Y and Z are silanol reactive groups selected from chloro and alkoxy.

7. A method according to claim 5 in which the silane is gamma-aminopropyltriethoxysilane.

8. A method according to claim 5 in which the siloxane is a polydimethylsiloxane having a viscosity at room temperature between about 2 and 200 centistokes.

9. A method according to claim 5 wherein the organosilicone coating is applied to the particles by forming a dispersion of the particles in the organosilicone and heating said dispersion to a temperature of from about 100° C. to 800° C. until it is dry.

10. A method according to claim 9 wherein the dispersion is heated to a temperature of from about 300° C. to about 600° C. until it is dry and agglomerates that form are broken up to form a fine powder having an average particle size between 0.1 to 100 microns.

11. A method according to claim 1 in which the screen is held and maintained at a negative potential relative to the substrate.

12. A method according to claim 1 in which a potential difference of about 300 volts to about 10,000 volts is established between said screen and said substrate.

13. A method according to claim 12 in which the potential difference is from about 2,000 volts to about 5,000 volts.

14. A method according to claim 1 in which the particle powders comprise metal oxides.

15. A method according to claim 14 in which the particles comprise a mixture of glass forming metal oxides containing 20 to 60 percent by weight of silica.

16. A method of forming an electrostatic print comprising the steps of:
 disposing a conductive stencil screen parallel to a hot conductive glass substrate separated from said substrate by a distance of about 0.01 to 0.5 inch;
 establishing and maintaining a potential difference of from 300 to 10,000 volts between the screen and the substrate with the screen held at negative potential;
 applying a dry, high melting point, free flowing decorating powder having an average particle size between 0.1 to 100 microns and consisting essentially of a baked hydrocarbon substituted organosilicone encapsulating particles of a glass forming composition containing 20 to 60% by weight of silica to the outer surface of the screen;
 passing the particles through the screen and onto said substrate; and
 heating the substrate to a temperature above the fusion point of said particles.

17. A method according to claim 16 in which said organosilicone is selected from silanes of the formula:

where R is a hydrocarbon radical selected from lower alkyl, aryl, alkenyl and substituted derivatives thereof, X is selected from halo, alkoxy and hydroxy and Y and Z are selected from X, R, amino and alkylamino.

References Cited

UNITED STATES PATENTS

| | | | |
|---|---|---|---|
| 3,168,389 | 2/1965 | Eilerman | 260—448.2 X |
| 3,238,053 | 3/1966 | Morgan | 117—17.5 |
| 3,241,483 | 3/1966 | Duff | 101—114 X |
| 3,247,153 | 4/1966 | De Vries | 117—100 X |
| 3,291,738 | 12/1966 | Sciambi | 252—62.1 |
| 2,618,551 | 11/1952 | Walkup | 252—62.1 X |
| 2,730,841 | 1/1956 | Searight | 117—100 X |
| 2,986,521 | 5/1961 | Weilicki | 117—17.5 X |
| 3,053,688 | 9/1962 | Greig | 252—62.1 X |
| 3,060,051 | 10/1962 | Johnson et al. | 252—62.1 X |
| 3,080,250 | 3/1963 | Claus | 252—62.1 X |
| 3,081,698 | 3/1963 | Childress et al. | 117—17.5 X |
| 3,099,569 | 7/1963 | Andrews | 117—100 X |
| 3,110,614 | 11/1963 | De Vries | 117—100 |
| 3,130,070 | 4/1964 | Potters et al. | 117—100 |
| 3,150,976 | 9/1964 | Johnson | 117—17.5 |

OTHER REFERENCES

Oughton, C. D.: "Decoration of Glass and Ceramic Articles by Xerography," in The Glass Industry, December 1949, pp. 662–4.

WILLIAM D. MARTIN, Primary Examiner

E. J. CABIC, Assistant Examiner

U.S. Cl. X.R.

65—60; 101—35, 114, 426; 106—49; 117—17.5, 18, 23, 100, 125, 229